(No Model.) 4 Sheets—Sheet 1.
H. BOESE.
CORN HARVESTER.

No. 575,871. Patented Jan. 26, 1897.

Witnesses
Chas. A. Ford.
V. B. Hillyard.

Inventor
Henry Boese,
By his Attorneys.
C. A. Snow & Co.

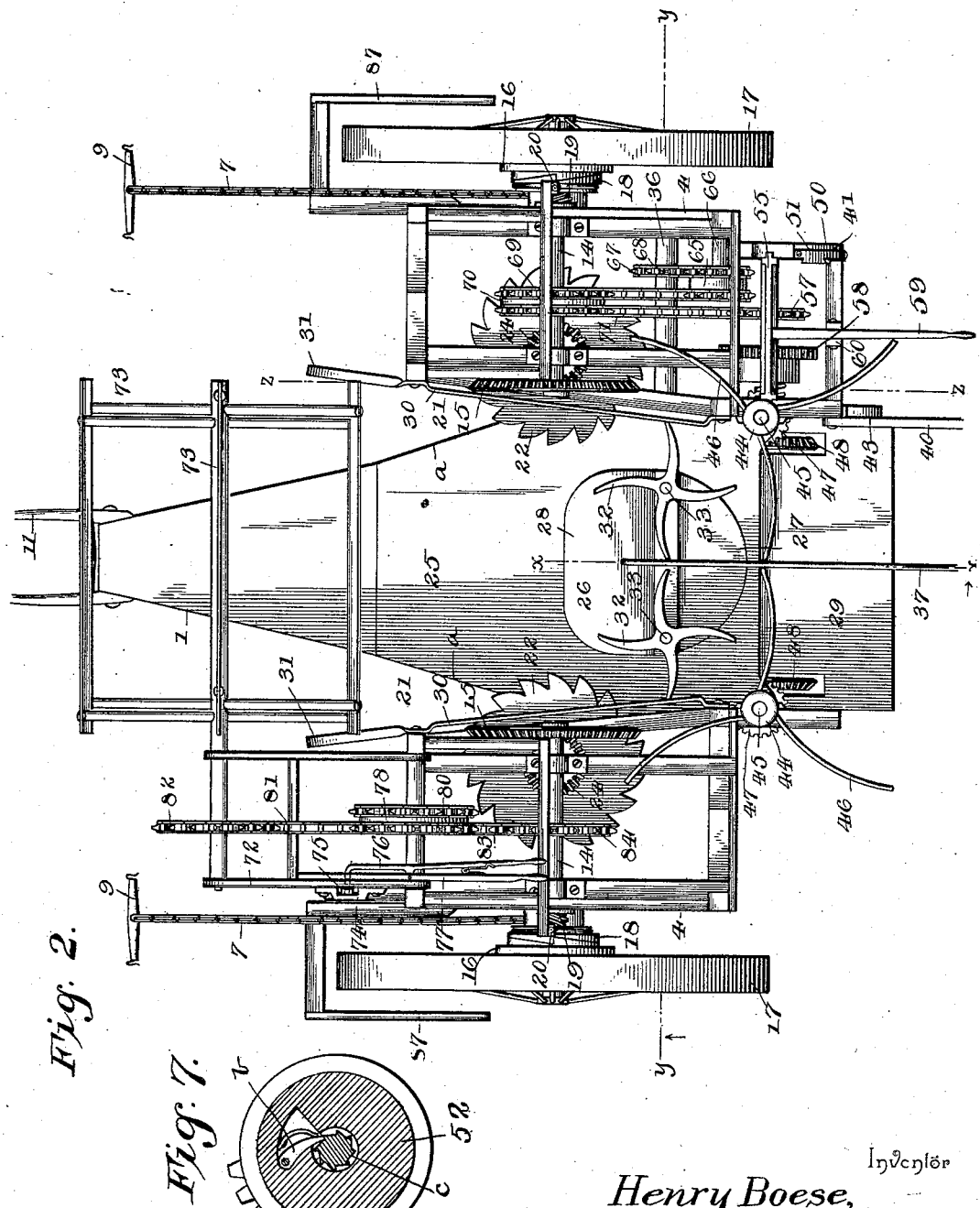

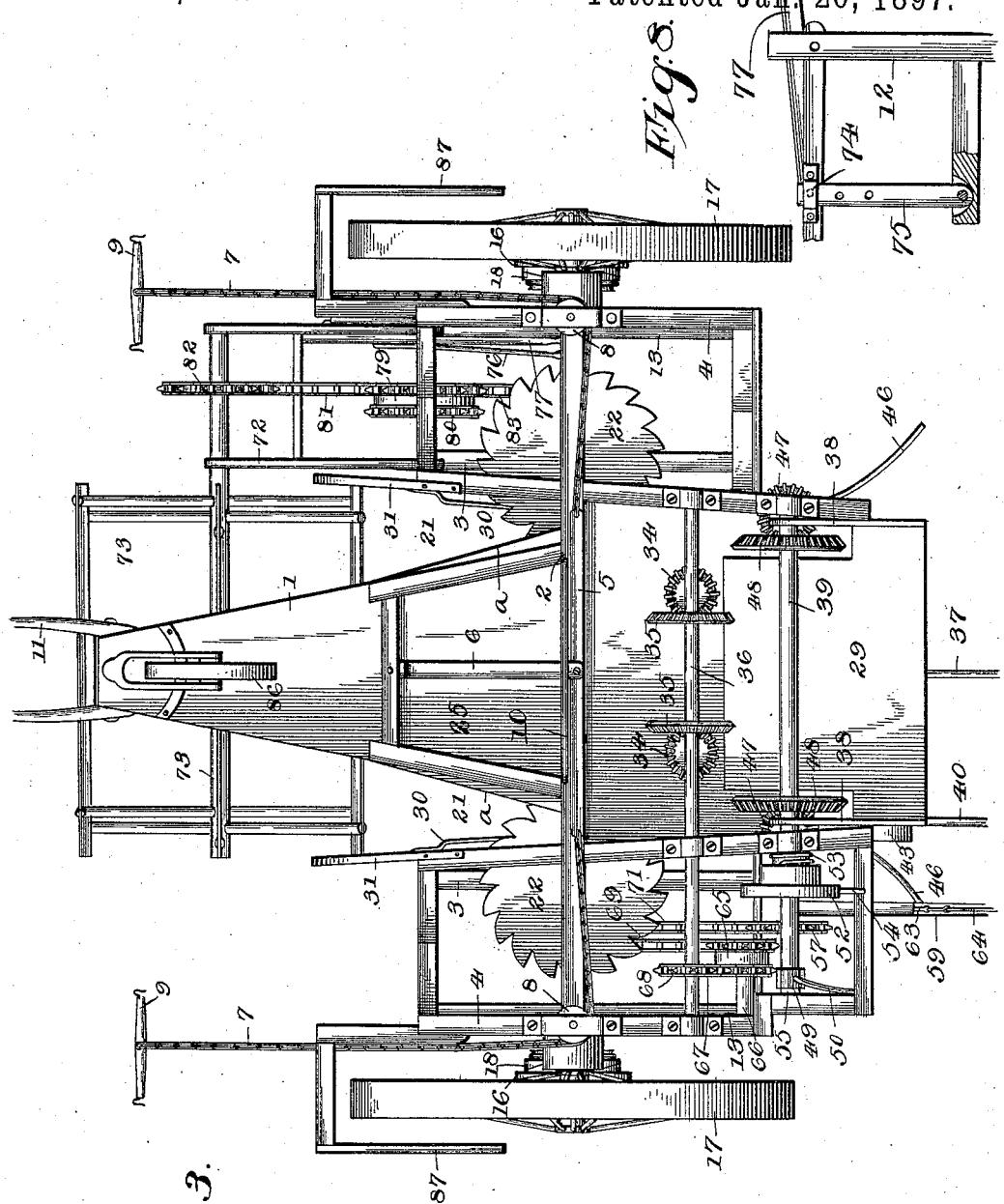

(No Model.) 4 Sheets—Sheet 4.

H. BOESE.
CORN HARVESTER.

No. 575,871. Patented Jan. 26, 1897.

Witnesses
Chas A Ford
V. B. Hillyard

Inventor
Henry Boese,
By his Attorneys,
C A Snow & Co.

UNITED STATES PATENT OFFICE.

HENRY BOESE, OF CROZIER, IOWA, ASSIGNOR TO THERESA BOESE, OF SAME PLACE.

CORN-HARVESTER.

SPECIFICATION forming part of Letters Patent No. 575,871, dated January 26, 1897.

Application filed July 8, 1895. Serial No. 555,253. (No model.)

*To all whom it may concern:*

Be it known that I, HENRY BOESE, a citizen of the United States, residing at Crozier, in the county of Buena Vista and State of Iowa, have invented a new and useful Corn-Harvester, of which the following is a specification.

This invention relates to machines for harvesting and shocking corn, and has for its object to provide an implement of this character which will cut and form the stalks into shocks and deposit the latter upon the ground in an upright position, and which will perform these several operations in a rapid and satisfactory manner without imposing any arduous task or labor upon the driver.

With these and other objects in view the improvement consists, essentially, of the novel features and the peculiar construction and combination of the parts, which hereinafter will be more fully set forth and claimed, and which are illustrated in the annexed drawings, in which—

Figure 1:
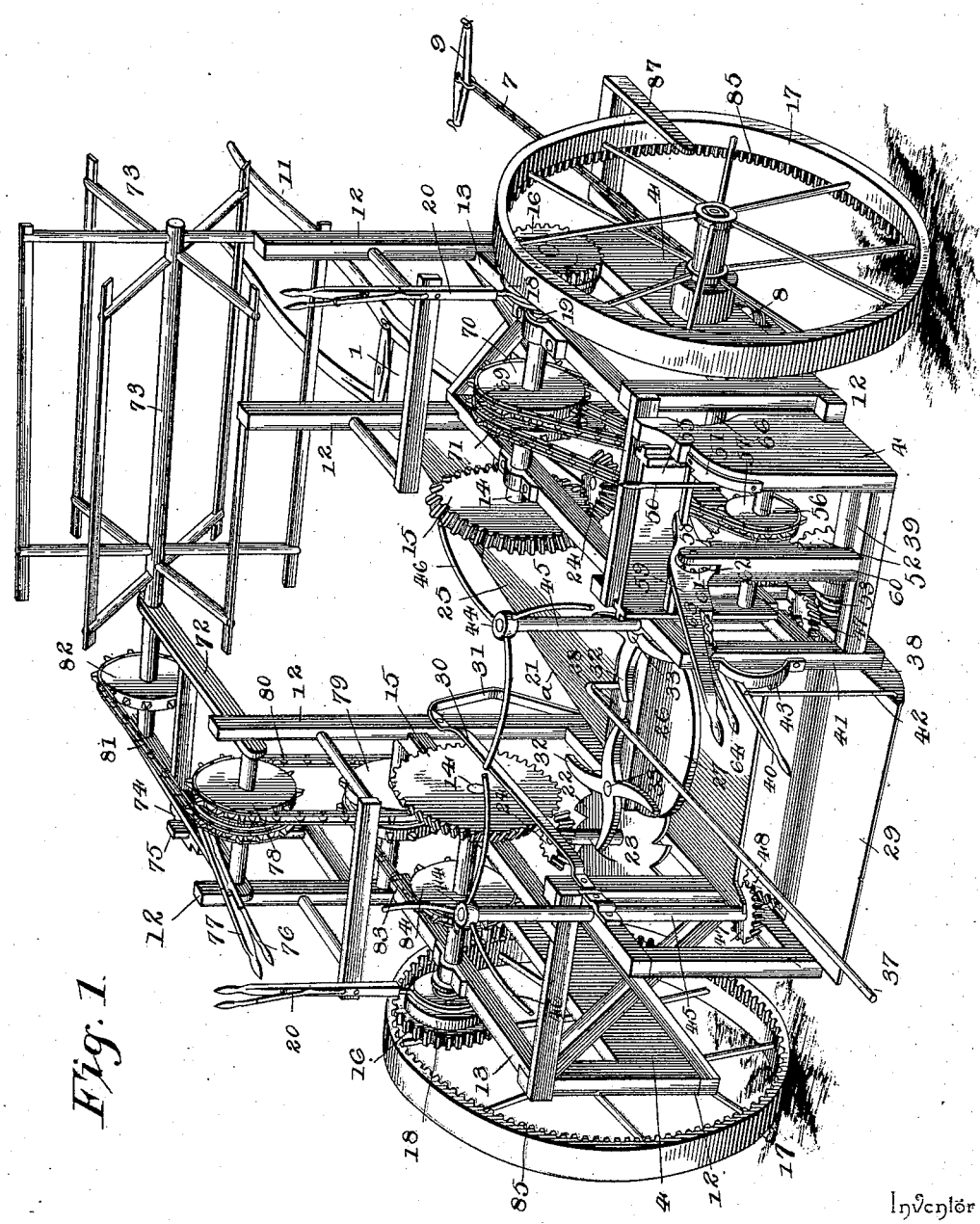
Figure 5:
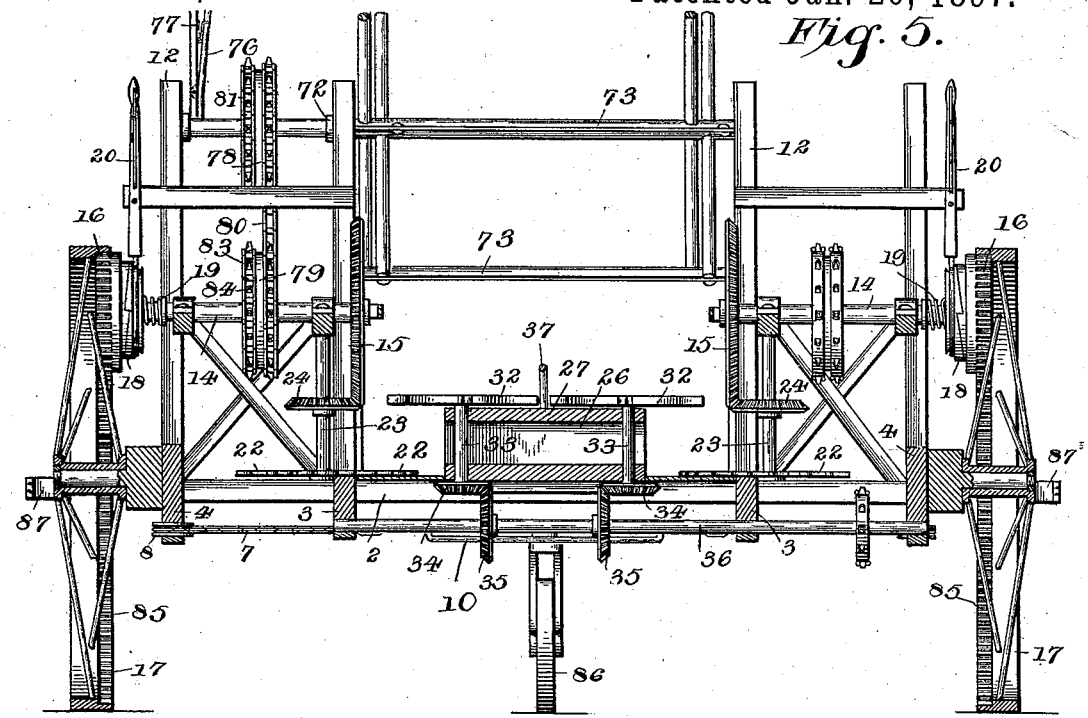
Figures 4, 6:
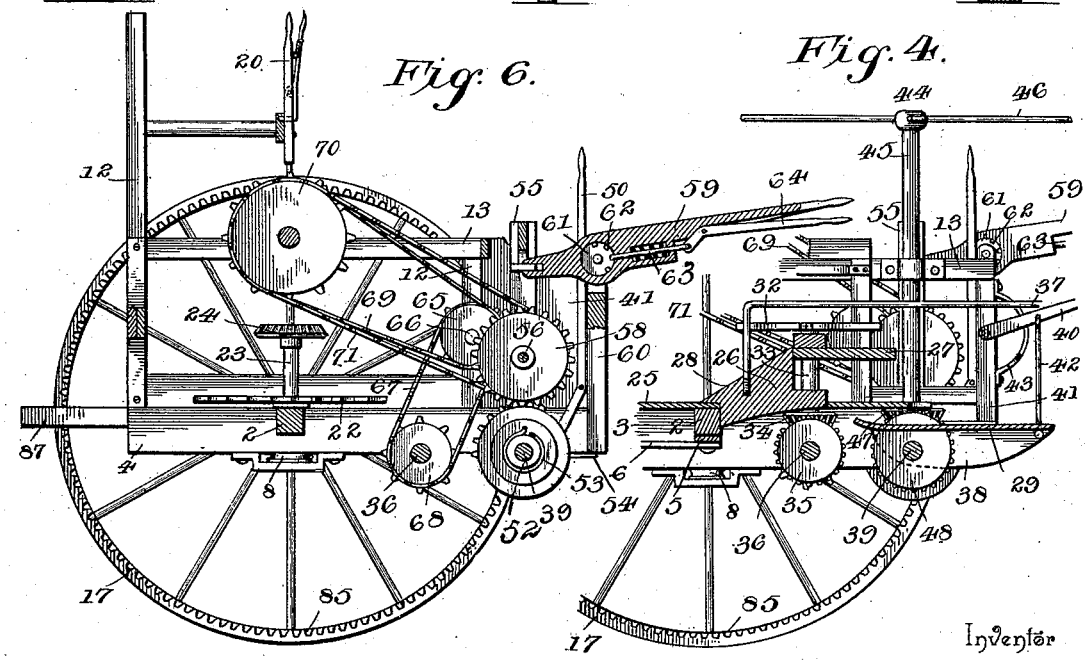

Figure 1 is a rear perspective view of a machine embodying the invention. Fig. 2 is a top plan view thereof. Fig. 3 is a bottom plan view of the machine. Fig. 4 is a longitudinal section on the line X X of Fig. 2, looking in the direction of the arrow, the front portion of the platform being broken away. Fig. 5 is a section about on the line Y Y of Fig. 2, looking to the front, as indicated by the arrow, showing the main wheels in central section. Fig. 6 is a detail section on the line Z Z of Fig. 2, looking to the right. Fig. 7 is a detail view of the mutilated gear-wheel, showing the ratchet-and-pawl connection between it and its supporting-shaft. Fig. 8 is a detail view of the pivoted reel-frame and the pivoted bar for holding the same in an adjusted position.

The platform 1 narrows from back to front and is supported upon a transverse beam 2, whose ends extend beyond the sides of the platform and are provided with short longitudinal beams 3 and 4, upon which are erected structures or framework for supporting the operating parts of the machine. An equalizing-bar 5 is pivotally attached midway of its ends to a forwardly-extending bar 6, which has pivotal connection at its front end with the platform 1 a short distance in advance of the transverse beam 2, and chains or cables 7 are attached to the opposite ends of the equalizing-bar 5 and extend outwardly and pass around pulleys 8, located on the beams 4, and proceed forwardly and have singletrees 9 at their front ends, to which the draft is applied in the usual manner. A keeper 10 is attached to the transverse beam 2 and supports the rear end of the bar 6, and consequently the equalizing-bar 5, which latter extends parallel with the transverse beam 2 and in proximate relation to the keeper. In addition to the singletrees 9 a pole or thills 11 are secured to the front end of the platform 1, thus making provision for a team of three horses, one to travel between the rows of corn to be cut and the other two exterior to the said rows.

Standards 12 extend vertically from the ends of the longitudinal beams 3 and 4, and are suitably strengthened by transverse and longitudinal braces, the longitudinal braces or bars 13 extending parallel with the respective longitudinal beams 3 and 4 and provided with bearings in which are journaled transverse shafts 14, having similar bevel gear-wheels 15 keyed to their inner ends and having pinions 16 loosely mounted upon their outer ends, said pinions being in mesh with internally-toothed rims of the ground or supporting wheels 17. The pinions 16 have half-clutches on their inner faces, which are adapted to be engaged by corresponding half-clutches formed on the opposing faces of clutch-sleeves 18, which are mounted upon the transverse shafts 14 so as to revolve therewith, but free to move to and from the respective pinions, and these clutch-sleeves are pressed outward by spiral springs 19, mounted upon the shafts 14 in the usual manner, and shipper-levers 20 are suitably disposed and located within convenient reach of the driver, so as to be operated to move the clutch-sleeves 18, whereby the respective mechanisms can be thrown in and out of gear.

Contracted passages 21 are formed between the front portions of the longitudinal beams 3 and the inner sides of the platform 1 to receive the stalks and guide the latter to the cutting apparatus, which latter consists of circular cutters 22, having saw-teeth, which are curved on their cutting or active edges, and which cutters are mounted upon vertical shafts 23, provided with bevel-pinions 24, which are adapted to mesh with the bevel gear-wheels 15, by means of which the said circular cutters 22 are rotated. The opposite edges of the platform 1 are provided with cutting-blades, which preferably form parts of a single plate 25, which latter is secured to the platform 1, and the edges of this plate 25 incline in opposite directions, substantially as shown in Figs. 2 and 3, to conform to the inclination of the sides of the platform 1.

A block 26 is located at the inner end of the platform 1, and its rear portion 27 is semicircular, and its top surface extends in a horizontal plane, and the front portion 28 slopes or tapers to the plane of the platform 1 and has its corners rounded, so as to offer no resistance to the passage of the stalks over the inner portion of the platform 1. Passage-ways are formed on each side of the block 26 to admit of the free movement of the stalks to the tilting or dumping platform 29 in the rear of the platform 1.

To prevent interference between the stalks and the gear-wheels 15, guards 30, consisting of bars, extend horizontally along the inner sides and a proper distance from the said bevel gear-wheels 15, and are attached to the inner vertical standards 12, and curve forwardly and downwardly at their front ends, thence rearwardly, and are attached at their inner rear ends to the lower sides of the longitudinal beams 3. The front portions 31 of the guards 30 are triangular-shaped and are bent outwardly, so as to coöperate with the inclined sides of the platform 1 to provide a sufficient flare to the front ends of the passages 21 so as to gather in the stalks, and the forward portions of the guards 31 being pointed serve to elevate leaning stalks and cause the same to enter the passages 21 as the machine is drawn over the field.

Packers 32 are located at the inner end of the platform 1, and are secured to vertical shafts 33, journaled in the block 26, and having bevel-pinions 34 at their lower ends to mesh with corresponding bevel-pinions 35 on a transverse shaft 36, located beneath the rear portion of the platform 1 and journaled in bearings provided on the longitudinal beams 3 and 4. These packers 32 comprise curved arms, and in the operation of the machine the said packers rotate so as to cause their arms to travel from front to rear with respect to the passages on each side of the block 26, whereby the stalks are moved rearwardly through said passages and upon the tilting or dumping platform 29.

A spring-rod 37 is attached at its front end to the block 26 and extends rearwardly beyond the rear end of the machine, and the shock is formed half on each side of the said rod, the latter being designed, in the tilting or dumping of the platform 29, to cause the shock to be deposited squarely upon the ground in an upright position. It will be seen that said rod 37 will free or clear itself from the shock on the advance movement of the machine, as will be readily understood.

The tilting or dumping platform 29 is located immediately in the rear of the platform 1, and is provided with depending edge portions 38, which are apertured for the passage of a transverse shaft 39, by means of which the said platform 29 is pivotally supported and upon which it tilts to dump or discharge the shock. A lever 40 is fulcrumed to a vertical post 41 of the frame, and is connected by a rod or wire 42 with the platform 29, and is adapted to raise and lower the platform, said lever being held in the required position by engagement with a notched segment 43, attached to the vertical post 41.

Shock-holders 44 are located immediately in the rear of the platform 1, and comprise vertical shafts 45, having reel-heads at their upper ends, from which extend curved arms 46, said curved arms being of such a length as to extend half the distance between the vertical shafts 45, and the oppositely-disposed arms unitedly extending across the entire distance between the said shafts 45, so as to support the shock upon the platform 29. The lower ends of the shafts 45 have bevel-pinions 47, which mesh with corresponding bevel gear-wheels 48, keyed upon the transverse shaft 39, and by means of which the shock-holders are positively actuated, so as to deposit the shock upon the ground when required. The end of the shaft 39 is formed with ratchet-teeth 49, which are engaged by the bent end of a lever 50, pivoted between its ends to a vertical post 41 and adapted to be engaged by a notched segment 51, by means of which the said lever 50 is held in positive engagement with a ratchet-tooth of the shaft 39, so as to prevent movement of the latter, thereby securing the shock-holders 44 from rotation during the process of forming the shock.

A mutilated gear-wheel 52 is mounted upon the shaft 39 and is provided with a coil-spring 53, by means of which it is returned to a normal position after the shock has been deposited upon the ground. A stop 54, projecting laterally or outwardly from the mutilated gear-wheel 52, is adapted to engage with a suitable portion of the framework of the machine and limit the rotation of the said mutilated gear-wheel in one direction. The mutilated gear-wheel 52 is loosely mounted upon the shaft 39 and is provided with a spring-actuated pawl $b$, which is adapted to engage with one of a series of ratchet-teeth $c$, formed in a portion of the shaft 39 encircled by the hub of the mutilated gear-wheel 52. The spring 53 has one end attached to the mutilated gear-wheel 52, and its opposite end is secured to a convenient portion of the frame and serves to hold the said mutilated gear-wheel in a normal position when the shock-holders are turning under the weight of the shock to admit of the latter dropping upon the ground.

A vertically-movable frame 55 is adapted to operate in suitable guideways formed in the inner sides of the pieces or blocks connecting the posts 41 with the adjacent standards 12, and this frame 55 is substantially U-shaped and has a short shaft 56 journaled between the lower ends of its members, and this shaft is provided with a sprocket-wheel 57 and a gear-wheel 58, the latter being adapted to mesh with the teeth of the mutilated gear-wheel 52. This frame 55 is moved vertically in its ways by means of a lever 59, which is fulcrumed to a standard 60, said standard having its upper end cleft and having a circular block 61 secured between the cleft portions, and upon which the lever 59 is mounted, and this block has a series of notches 62, which are adapted to be engaged by means of a spring-actuated locking-bolt 63, operating through a portion of the lever 59, so as to hold the latter in an adjusted position, a hand-latch 64 being provided and having connection with the locking-bolt 63, so as to operate the latter in the usual manner. When the frame 55 is lowered, the gear-wheel 58 will mesh with the teeth of the mutilated gear-wheel 52 and cause a positive rotation of the shaft 39, so as to deposit the shock upon the ground, it being understood that the lever 50 is previously disengaged from the ratchet-teeth 49 of the said shaft 39.

A twin sprocket-idler 65 is mounted upon a stub-shaft 66, attached to one of the standards 12, and a sprocket-chain 67 passes around one member of the sprocket-idler and around a sprocket-pinion 68, keyed upon the transverse shaft 36, thereby transmitting motion to the said shaft 36, whereby the packers 32 are actuated in the operation of the machine. A sprocket-chain 69 passes around the other member of the sprocket-idler 65 and around a corresponding member of a twin sprocket gear-wheel 70, mounted upon the adjacent transverse shaft 14, whereby direct motion is imparted to the mechanisms dependent for their operation upon the rotation of the idler 65. A sprocket-chain 71 passes around the other member of the twin sprocket gear-wheel 70 and around the sprocket-wheel 57, so as to rotate the shaft 56 for the purpose set forth.

The vertical movement of the frame 55 is slight, so as to admit of the disengagement of the teeth of the gear-wheels 58 and 52. Hence there is no necessity to make provision for taking up the small amount of slack in the chain 71 occasioned by the vertical movement of the frame 55 to unmesh the gear-wheels 58 and 52.

It will be understood that, if desired, any of the ordinary means for preserving a uniform tension upon the chain 71 may be resorted to.

A swinging frame 72, normally occupying a horizontal position, has pivotal connection at its inner end with the upper extremities of the front left-hand vertical standards 12 and supports a reel 73, of ordinary construction, at its outer end, and this reel 73 is adapted to operate over the front portion of the platform 1, so as to push or cause the upper ends of the stalks to move rearwardly through the passages 21.

A keeper 74 is located on one side of the frame 72, and through it operates loosely a bar 75, pivoted at its lower end and having a series of openings in its length to be engaged by the bent end of a spring-actuated locking-lever 76, provided on the operating-lever 77, by means of which the frame 72 is raised and lowered at its front end, whereby the reel 73 is caused to occur at the required elevation.

A double sprocket-gear 78 is mounted in line with or upon the pivotal support of the frame 72, and a corresponding double sprocket-gear 79 is located below the sprocket-gear 78, and the two sprocket-gears 78 and 79 have corresponding members connected by means of a sprocket-chain 80, and a sprocket-chain 81 connects the opposite member of the sprocket-gear 78 with a sprocket-wheel 82 on the inner end of the reel-shaft 73, and a sprocket-chain 83 connects the other member of the sprocket-gear 79 with a sprocket-wheel 84, mounted upon the adjacent transverse shaft 14, thereby transmitting motion from the said shaft 14 to the reel, as will be readily comprehended.

The ground or supporting wheels 17 have internally-toothed rims 85, which are in mesh with the respective pinions 16, so as to impart motion to the operating parts as the machine is drawn forward, and these wheels 17 support the rear portion of the machine, the front end of the platform being supported upon a caster 86, which is adapted to conform to any variation in the rows and also to admit of the machine being readily turned at the end of the field in the usual manner. To prevent injury to the side horses and keep them from engagement with the ground-wheels 17, fenders or guards 87 are provided and extend in front of and a short distance on each side of the said wheels, said fenders being attached to the front ends of the longitudinal beams 4.

The operation of the invention is as follows: The machine being drawn over the field, the several parts are operated in the manner set forth, and the stalks entering the passages 21 are severed by means of the circular cutters 22 in conjunction with the inclined cutters 25, and said stalks are assisted in their movement through the passages 21 by means of the reel 73. After the stalks have been cut they are engaged by the packers 32 and moved rearwardly through the passages formed on each side of the block 26 and on to the tilting or dumping platform 29, said stalks being retained until a sufficient quantity has accumulated to form a shock by means of the shock-holders 44. The rear portion 27 of the block 26 disengages the stalks from the packers and prevents the latter from carrying the said stalks forward, as will be readily understood. By having the front portion of the block 26 sloping and the corners rounded the stalks are prevented from lodging and banking up in front of the block and are more readily directed to the passages formed at the sides thereof, and by having the sides and rear of the block formed vertically the stalks will move in the proper direction and become automatically disengaged from the packer-arms when the rear ends of the passages are reached, and the packers being elevated a distance above the platform 1 will engage positively with the stalks a distance from their butt-ends and move them rearwardly in the formation of the shock. After a sufficient number of stalks have accumulated upon the platform 29 to form a shock of the required size, the machine is brought to a standstill and the driver binds the shock after any approved manner, and this being accomplished the platform 29 is tilted by releasing the lever 40 from the notched segment 43, and the lever 50 is disengaged from the ratchet-teeth 49 so as to release the shaft 39, and the lever 59 is operated so as to move the vertical frame 55 and bring the gear-wheels 58 and 52 in mesh, after which the team is started and the machine advanced so as to operate the shock-holders 44 in the manner herein set forth, whereby the shock is deposited upon the ground, the spring-rod 37 causing the said shock to maintain and be deposited upon the ground in an upright or vertical position. After the shock has been unloaded the platform 29 is returned into a normal position, the frame 55 moved upward so as to disengage the gear-wheels 58 and 52, and the lever 50 is operated so as to lock the shaft 39 in a normal position, after which the machine is in condition for repeating the operation just described.

When the shock is forming, a pair of arms 46 extend across the space in the rear of the packers and support the stalks in an upright position, and after the shock has grown to the required proportion or size the machine is stopped, the shock bound, the shaft 39 released, the frame 55 lowered to bring the teeth of the gear-wheels 58 and 52 into mesh, and the machine again started, and by reason of the intermeshing gearing 58 and 52 and the ratchet-and-pawl connection b and c between the mutilated gear 52 and the shaft 39 the latter is positively rotated and, through the mechanism herein described, turns the shafts 45 a sufficient distance to move the arm supporting the shock rearwardly, so as to release the shock, and at the same time bringing the next set of arms into position to sustain the incoming stalks during the formation of a subsequent shock. As the next or succeeding arms 46 come into position they engage with the bound shock and move it on to the platform 29, from which it is discharged in the manner set forth. The teeth on the mutilated gear 52 are in sufficient number to admit of the shaft 39 being turned a distance so as to bring the succeeding arms 46 into proper position, and upon lifting the frame 55 to throw the teeth of the gear-wheel 58 out of the path of the teeth of the gear-wheel 52 the latter will be returned to a normal position by means of the spring 53, when the parts will be in position for a repetition of the operation just described.

In adapting the invention to machines of different patterns it is to be understood that changes in the form, proportion, and the minor details of construction may be resorted to without departing from the principle or sacrificing any of the advantages of this invention.

Having thus described the invention, what is claimed as new is—

1. In a corn-harvester, the combination of a platform gradually increasing in width from the front toward its rear end, oppositely-disposed guards forming converging passages at the sides of the platform, cutters operating at the inner ends of the passages, a block secured upon the rear portion of the platform and having passages between its sides and the aforesaid guards, the front portion of the block sloping to the plane of the platform and having its corners rounded, and the rear portion having its top side extending in substantially a horizontal plane and semicircular in outline, and its rear and side walls substantially vertical and packers journaled vertically in the said block and operating thereover, and constructed to move the stalks rearwardly through the passages at the sides of the said block, substantially as set forth.

2. In a corn-harvester, the combination of a platform, cutting apparatus, a block located at the inner or rear end of the platform and having passages at its sides, packers journaled vertically in the said block to move the stalks through the passages and form them into a shock, a tilting platform immediately in the rear of the main platform, shafts journaled vertically at the rear ends of the side passages and having coacting arms to retain the stalks, actuating mechanism under the control of the driver to throw the said shafts in gear to actuate them for positively discharging the shock, and a spring-rod extending rearwardly over the tilting platform and secured at its front end to the aforesaid block, substantially as and for the purpose set forth.

3. In a corn-harvester, the combination with the platform, the cutting apparatus, and packers for forming the shock, of shock-holders, a shaft operatively connected with the shock-holders for actuating the latter, a locking mechanism to secure said shaft against rotation, whereby the shock-holders will sustain the stalks during the formation of the shock, a mutilated gear mounted upon and having a ratchet-and-pawl connection with the said shaft and provided with a stop to limit its movement in one direction, a returning-spring operatively connected with the mutilated gear to return it to a normal or operative position, and a movable frame provided with a power-driven gear-wheel which is adapted to be brought in mesh with the mutilated gear, whereby the shock-holders are positively operated to deposit the shock upon the ground, substantially in the manner set forth.

4. In a corn-harvester, the combination of the platform having passages at its sides, cutters operating at the inner ends of the passages, packers journaled vertically and adapted to move the stalks rearwardly, shock-holders disposed in the rear of the packers, and comprising vertical shafts and coacting arms, a transversely-disposed shaft operatively connected with the shock-holders and having a ratchet portion, a detent-lever to be engaged with the ratchet-teeth of the said shaft to secure the shock-holders against turning, a mutilated gear-wheel having a limited turning movement upon the said shaft, and having a ratchet-and-pawl connection therewith, means for returning the mutilated gear to a normal position, and actuating mechanism to be thrown in mesh with the said mutilated gear-wheel for positively operating the shock-holders to deposit the shock upon the ground, substantially as set forth.

In testimony that I claim the foregoing as my own I have hereto affixed my signature in the presence of two witnesses.

HENRY BOESE.

Witnesses:
FREDERICK BLESSMAN,
CHARLES J. GOTSCH.